May 14, 1957   J. M. JONES, JR   2,791,902
AUTOMATIC AND CONTINUOUSLY RECORDING VISCOSIMETERS
Filed Aug. 27, 1953
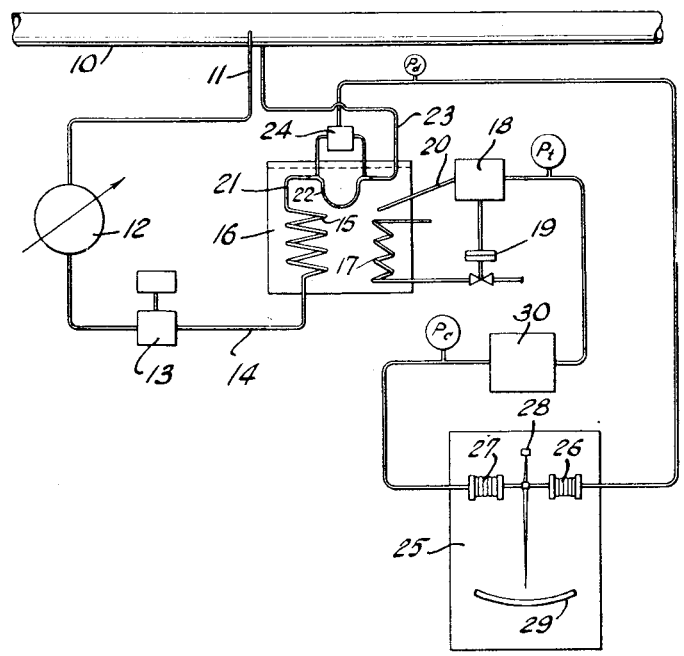

2,791,902
Patented May 14, 1957

2,791,902
AUTOMATIC AND CONTINUOUSLY RECORDING VISCOSIMETERS

James M. Jones, Jr., Port Arthur, Tex., assignor to The Texas Company, New York, N. Y., a corporation of Delaware Application August 27, 1953, Serial No. 376,949

6 Claims. (Cl. 73—55)

This invention relates to an apparatus for automatically and continuously recording the viscosity of a fluid such, for example, as lubricating oil.

It is well known that the viscosity of oil can be determined by measuring the differential in pressure obtained when the oil is pumped through a calibrated tube, providing the flow rate and flow temperature are kept constant. Constant pressure is not difficult to maintain but slight fluctuations in temperature sometimes are difficult to prevent. By employing complicated and generally expensive equipment the temperature can be very accurately controlled, but where the installation of such equipment is not justified some other simpler and less expensive apparatus providing reasonably accurate control is indicated. My improved apparatus meets such a need. Instead of attempting to very accurately control temperature I provide a method of compensating for such temperature changes as may occur so that they will not affect the recording mechanism and only a change in actual viscosity rather than a change due to a change in the temperature of the oil will actuate the recording mechanism. Thus, according to my invention, the differential pressure obtained at constant oil flowing rate and constant temperature, which is a function of viscosity, is compensated automatically for such slight variations in temperature as may occur. Another feature of my invention is that the apparatus required can readily be assembled with instruments which ordinarily are available in stock in an oil refinery or manufacturing plant.

In the single figure of the drawing there is shown schematically the assembly of instruments utilized in the performance of my improved method.

In the drawing there is shown a flow line 10 which may be a pipe line or, as here, a line through which a stream of lubricating oil is drawn from a fractionating tower to tankage (not shown). A small pipe 11 connecting the the flow line 10 with a cooler 12 provides the means for continuously withdrawing a relatively small sample stream of oil from the line 10 and passing it to the cooler 12 wherein the temperature of the oil sample is reduced to a temperature below that at which it is desired to measure and record the viscosity of the oil. From the cooler 12 the oil is pumped at a constant rate by a pump 13 through a pipe 14 to a heating coil 15 disposed within a constant temperature bath 16 for the purpose of which is to reheat the oil in the coil 15 to the desired temperature and to maintain that temperature relatively constant. Heat is supplied to the bath 15 by a steam coil 17, the heating rate being controlled by a temperature controlling element 18 which operates a flow control valve 19 in the discharge line from the heating coil 17. A thermocouple 20 actuates the temperature control element 18.

After passing through the heating coil 15, the coil passes through a pipe 21 to calibrated tube such as a U-tube 22 and after leaving the tube the oil is returned through a pipe 23 to the flow line 10, discharging through pipe 23 into the line at a point near the point at which the stream originally was withdrawn. A differential sensing element 24 which is connected across the opposite ends of the U-tube 22 is provided to detect any pressure change across the U-tube 22 which may result from changes in the viscosity of the flowing oil. Such changes may be due to variations in viscosity of the oil or changes in temperature, or both. The output from this sensing element 24 may be pressure and this pressure is conducted as a first impulse through a conduit to a recording mechanism 25 to record the changes in viscosity of the flowing oil.

The recording element 25 is provided with bellows 26 and 27 which act through mechanical linkage (not shown) to actuate a recording pen 28 which operates in conjunction with a scale 29. A first pressure output impulse developed by the differential sensing element 24, which may be represented by the symbol $Pd$, is conducted by a conduit to the bellows 26 to develop a pressure-resultant impulse proportional to the pressure output of element 24. A second pressure output impulse developed by the temperature sensing and controlling element 18 is proportional to the sensed temperature and may be represented by the symbol $Pt$. Changes in $Pd$ and $Pt$ are opposite one another in sign. This pressure output impulse $Pt$, which will vary with temperature, is conducted by a conduit to a reversing relay 30 wherein it is reversed in sign and the resultant third impulse $Pc$ is conducted to the bellows 27 to develop a temperature-resultant impulse proportional to the pressure output of element 18. Bellows 27 is opposed to bellows 26 through a linkage associated with viscosity indicating pen 28 to compensate for changes in apparent viscosity due to variations in temperature, and produce a resultant indication of actual viscosity. Pen 28 thus constitutes a viscosity indicator operable by the bellows 26 and 27. The magnitude of the pressure in bellows 27 and its rate of change with temperature must be compatible with the pressure in bellows 26 and the rate of change of pressure due to change in temperature in bellows 26 as a change in temperature also changes the viscosity of the oil. The arrangement for making these values compatible is an important feature of the present invention.

To illustrate, an increase in temperature of the oil will result in a decrease in the pressure in bellows 26 as increasing temperature decreases viscosity and thus causes a decrease in the pressure $Pd$. The effect of a change in temperature must be opposite in each of the two bellows 26 and 27. This effect is accomplished by using a reversing relay 30 such, for example, as a Null-matic M/F (multi-function) relay manufactured by Moore Product Company and described in that company's bulletin AD68, issue of December 1955. The relay 30 is capable of converting the pressure impulse $Pt$ to some other third pressure $Pc$ of opposite sign which may be larger or smaller than $Pd$ and a change in one results in a corresponding change in the opposite direction in the other. The sensitivity of the reversing relay 30 is susceptible to adjustment and it must be adjusted to give a change in $Pc$ numerically equal to a change in $Pd$ when these variations are caused by variations in temperature. In other words, the magnitude of the change in pressure in the bellows 26 due to changes in temperature of the oil flowing through the U-tube 22 can be determined and the proportionality of the reversing relay 30 and its sensitivity can be adjusted so that the magnitude of the change in $Pc$ is equal to the magnitude of the change in $Pd$. When these values are equal and opposite there will be no effect of a temperature change upon the reading of the viscosity recording mechanism 25.

In some cases, as for example where the present apparatus is used to measure the viscosity of oil flowing through a pipeline at atmospheric temperature to distinguish between batches having different viscosities, the elements used for primary control of the bath temperature can be omitted and the temperature variations sensed by the thermocouple 20 alone used to compensate for the effect of all variations in bath temperature upon viscosity.

It should be understood that while a pneumatic system of control has been described herein, any equivalent system, such as an electrical or electronic system, can be employed with corresponding results.

Obviously, many modifications and variations of the invention as herein described may be made without departing from the spirit and scope thereof, and accordingly only such limitations should be imposed as are indicated in the appended claims.

I claim:

1. Apparatus for continuously indicating the viscosity of a fluid as it flows through a line comprising means for continuously withdrawing a sample of the fluid from said line, means for heating said fluid sample to a predetermined and substantially constant temperature, means for sensing changes which may occur in the temperature of said fluid sample, said temperature sensing means providing a pressure output proportional to the sensed temperature, means responsive to said temperature sensing means for controlling the temperature of said fluid sample, a calibrated tube, means for forcing said heated fluid at a constant rate of flow to and through said calibrated tube, a differential pressure sensing element connected across said calibrated tube for detecting pressure changes and developing a pressure output, indicating mechanism, means for conducting the pressure output of said differential pressure sensing element to said indicating mechanism, a reversing relay, means for conducting the pressure output of said temperature sensing means to said reversing relay, and means for conducting the pressure output of said reversing relay to said indicating mechanism to compensate for changes in the temperature of the fluid.

2. An apparatus of the class described in claim 1 wherein the calibrated tube is a U-tube.

3. Apparatus for continuously indicating the viscosity of a fluid comprising means for withdrawing at a constant rate of flow a continuously flowing sample of said fluid, means for heating said fluid to a predetermined and substantially constant temperature, means for sensing changes which may occur in the temperature of said fluid, said temperature sensing means providing a pressure output proportional to the sensed temperature, a tube through which said heated fluid is passed, a differential pressure sensing element mounted across said tube for detecting pressure changes and developing a pressure output, an indicating mechanism, means for conducting the pressure output of said differential pressure sensing element to said indicating mechanism, a reversing relay, means for conducting the pressure output of said temperature sensing means to said reversing relay, and means for conducting the pressure output of said reversing relay to said indicating means to compensate for changes in the temperature of the fluid.

4. An apparatus of the class described in claim 3 wherein the tube is a U-tube.

5. Apparatus for continuously indicating the viscosity of a liquid as it flows through a line comprising means for continuously withdrawing a sample of the liquid from said line; a calibrated tube; means for forcing said liquid at a constant rate of flow to and through said calibrated tube; a differential pressure sensing element connected across said calibrated tube for detecting pressure changes and developing a pressure output; means connected to said differential pressure sensing element for developing a pressure-resultant impulse proportional to the pressure output from said differential pressure sensing element; temperature sensing means for sensing changes in the temperature of said liquid sample, said temperature sensing means providing a pressure output proportional to the sensed temperature; means connected to said temperature sensing means for developing a temperature-resultant impulse proportional to the pressure output of said temperature sensing means; means for opposing said pressure-resultant impulse with said temperature-resultant impulse to produce a resultant indication of actual viscosity, thereby compensating for changes in apparent viscosity due to variations in the temperature of said liquid; and a viscosity indicator operable by said last-named means.

6. Apparatus for continuously indicating the viscosity of a liquid as it flows through a line comprising means for continuously withdrawing a sample of the liquid from said line; means for maintaining said liquid sample at a predetermined and substantially constant temperature; means for sensing changes in the temperature of said liquid sample, said temperature sensing means providing a pressure output proportional to the sensed temperature; a calibrated tube; means for forcing said liquid at a constant rate of flow to and through said calibrated tube; a differential pressure sensing element connected across said calibrated tube for detecting pressure changes and developing a pressure output; means for conducting a first pressure output impulse from said differential pressure sensing element; means for conducting from said temperature sensing means a second pressure output impulse, changes in said second impulse being opposite in sign to changes in said first impulse; means for reversing the sign of one of said impulses and developing a third impulse of opposite sign therefrom but of like sign to the other of said impulses; means for opposing said third impulse to said other of said impulses to produce a resultant indication of actual viscosity, thereby compensating for changes in apparent viscosity due to variations in the temperature of said liquid; and a viscosity indicator operable by said last-named means.

References Cited in the file of this patent

UNITED STATES PATENTS

| 1,534,091 | Smoot | Apr. 21, 1925 |
| 2,131,379 | Lay | Sept. 27, 1938 |
| 2,322,814 | Binckley | June 29, 1943 |
| 2,396,420 | Hayward et al. | Mar. 12, 1946 |
| 2,503,675 | Marusov | Apr. 11, 1950 |